United States Patent [19]
De Lavalette et al.

[11] 3,825,982
[45] July 30, 1974

[54] METHOD OF MAKING LOW FRICTION BEARINGS AND BEARINGS MADE THEREFROM

[75] Inventors: Pierre De Lacroix De Lavalette, Paris; Daniel Hein, Choisy-Le-Roi; Georges Boudet, Tours; Jean-Claude Meyer, Tours; Alain Neron, Tours; Alain Bianunier, Semblancay; Alain Blaiberg, Mettray; Jean Louis Nouveau, Noizay; Jacques Georges Charpentier, Tours; Alain Jacquot, Tours, all of France

[73] Assignee: SKF Compagnie D'Applications Mecaniques, Clamart, France

[22] Filed: Jan. 12, 1973

[21] Appl. No.: 323,321

[30] Foreign Application Priority Data
Jan. 19, 1972 France .......................... 72.01767

[52] U.S. Cl. ........... 29/149.5 NM, 29/195, 308/238
[51] Int. Cl. ..... B23p 11/00, B23p 3/00, F16c 33/28
[58] Field of Search............ 29/149.5 R, 149.5 NM, 149.5 S, 29/DIG. 26, 195; 308/238

[56] References Cited
UNITED STATES PATENTS
3,047,934   8/1962   Magner, Jr. ............... 29/149.5 NM
3,606,657   9/1971   Horikawa .................. 29/149.5 NM Primary Examiner—Thomas H. Eager
Attorney, Agent, or Firm—Brisebois & Kruger

[57] ABSTRACT

Bearing material comprises strip of cloth having upper surface of fluorocarbon resin threads and lower surface comprising metallic threads soldered to a metallic supporting strip. Fluorocarbon threads are embedded in a resin layer which is partially hardened before the material is cut and shaped, but completely hardened only after shaping has been completed.

21 Claims, 3 Drawing Figures

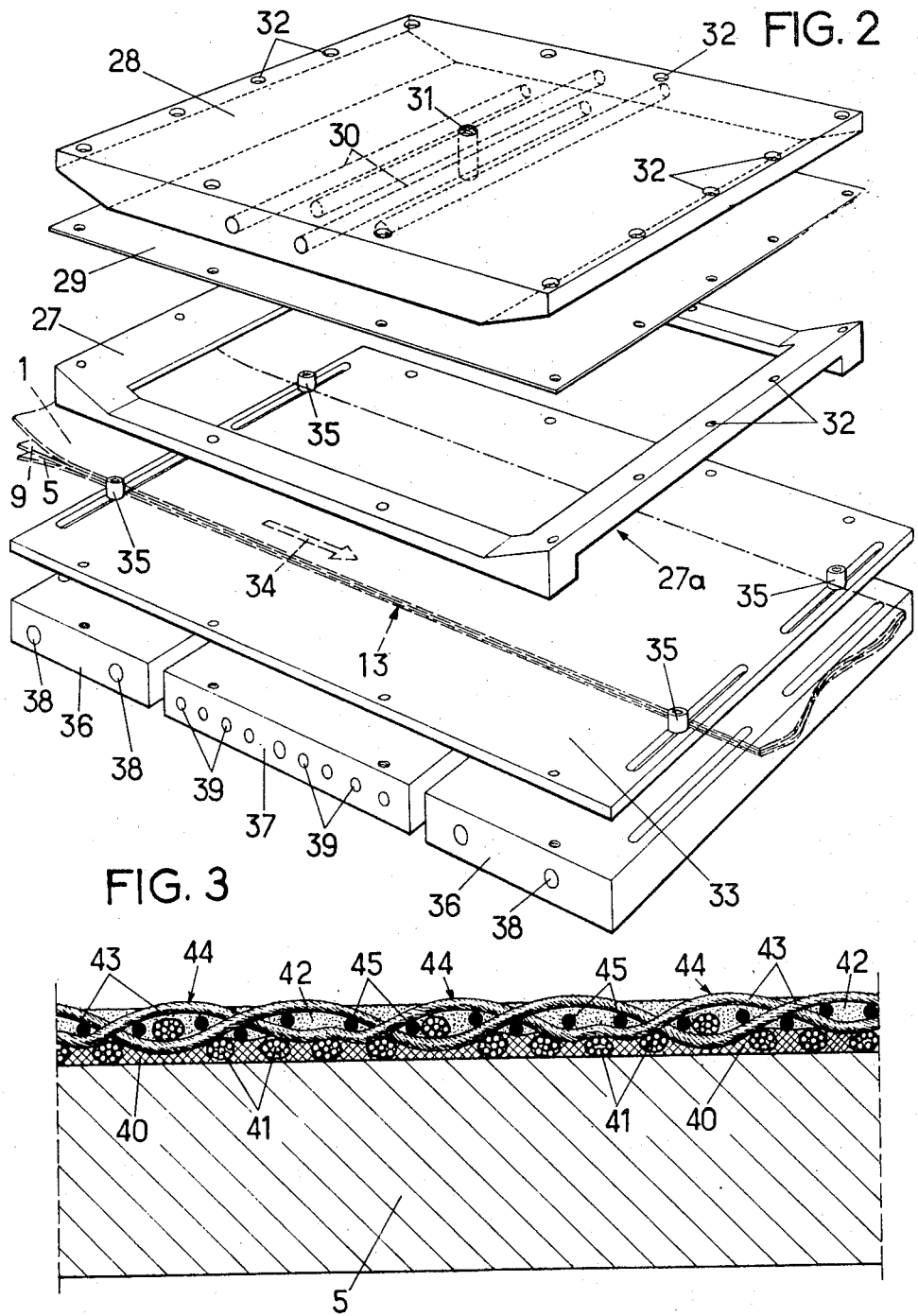

METHOD OF MAKING LOW FRICTION BEARINGS AND BEARINGS MADE THEREFROM

SUMMARY OF THE INVENTION

This invention relates to a method of making bearings in which the bearing is lined with a layer of a material capable of reducing friction.

There is a known method of making low friction bearings in which the inner surface of the bearing consists of a layer of polytetrafluoroethylene resin, better known under the trademark TEFLON. This resin is deposited, for example, on the inner surface of a sintered bronze bush fixed in a bearing block. The polytetrafluoroethylene resin used has, however, the disadvantage that the permissible load is limited so that such bearings must be confined to applications in which the operating pressure is relatively low.

In order to overcome this disadvantage it has been suggested that webs be used consisting of linearly polymerized polytetrafluoroethylene threads. As a consequence of this particular polymerization a much greater resistance to pressure is obtained than in the case of the preceding resin. The known webs have usually had two faces, one consisting of TEFLON threads and the other of glass fiber threads, the assembly being embedded in BAKELITE so as to increase the rigidity of the web.

Low friction bearings have been made from such webs by adhesively securing the double-faced web to the inside of a previously machined ring with the glass fiber surface on the inside. The web is usually attached manually by means of an adhesive adapted to this particular material, as for example, an epoxy resin. The assembly is then introduced into a furnace for a time sufficiently long to insure polymerization of the adhesive.

In such processes it is impractical to shape the bearing after the web has been attached by such an adhesive. During the shaping operation the web slides on the metal support if the adhesive is not sufficiently polymerized. On the contrary, if the adhesive is too hard, the shaping step ruptures the bond.

This method of manufacturing low friction bearings also has the disadvantage of being very slow and cumbersome so that it does not lend itself well to commercial applications.

Moreover, bearings and bearing surfaces manufactured in this manner do not permit the use of high speed shafts, since the very poor transmission of the heat through the adhesive and the glass cloth leads to an increase in temperature which may become quite high and adversely affect the performance of the bearing.

It has also been suggested that such double-faced webs having one surface made of TEFLON fibers be attached by means of solder adhering to metallic wires interwoven with the TEFLON threads.

In the bearings made according to such processes, the TEFLON threads which form the contact surface are not gripped firmly enough either during cutting of the pieces before shaping or even during their use.

These bearings have a certain tendency to ravel out and some creeping of the TEFLON threads occurs which limits their performance and working life.

The process according to the invention makes it possible to manufacture bearings having a very low coefficient of friction and capable of supporting loads up to 60 Kg/mm$^2$, in a much more rapid and simple manner than previously known processes and thus makes it possible to produce them at a distinctly lower cost.

It is an object of the present invention to provide a process in which it is possible to adequately attach a web having a surface of TEFLON threads to a substantially flat support so as to permit stamping or shaping of the assembly after attachment, with the web perfectly following the changes in contour of the support during this shaping.

The process according to the invention also permits the manufacture of bearings in which the heat transfer is excellent.

The present invention likewise permits a substantial improvement in the grip on the TEFLON fibers and thus the elimination of the unraveling and creeping of the threads which reduces the working life of bearings and bearing surfaces of the known type.

The present invention also envisages the improvement of the operation of soldering the web so as to render the manufacture of bearings quicker and less cumbersome.

According to one of the essential characteristics of the invention the process of manufacturing bearings comprises the following step:

The metallic surface of a double-faced web having metallic threads and threads of a thermoplastic fluorocarbon resin such as TEFLON is first continuously soldered onto a flat metal stamping of any desired dimensions.

In a preferred embodiment of the invention a cloth having a TEFLON warp and copper woof is used.

In another embodiment the metallic threads are of stainless steel.

The melting temperature of the solder is about 230°C and the TEFLON thread resists temperatures up to 290°C, so that is will be seen that it is possible to utilize the temperature required for soldering without degrading the TEFLON threads of the cloth.

The solder used may consist of an alloy of tin and another metal so that the melting temperature thereof is less than 230°C. A good example of such a solder is a eutectic comprising 63 percent tin and 37 percent lead which melts at 183°C.

After the soldering operation, the double-faced cloth hereinbefore described is preferably embedded in a product having a low melting point such as paraffin, which is solid at the ambient temperature and has antifriction properties, and is capable of impregnating the cloth when in the liquid stage.

This step makes it possible to cut the metal sheet covered by the cloth without causing subsequent fraying or unravelling of the cloth. The fact that the TEFLON cloth is soldered to the tin metal sheet through copper wires makes it possible to cut and shape the bearings, operations which were impossible when using a known cloth and conventional adhesive which, after drying, could not undergo a shaping step, because of its lack of flexibility.

In another embodiment of the invention, a layer of thermosetting resin which partially hardens when cold, or at a temperature insufficient to result in complete hardening by polymerization of the resin, is applied to the outer surface of the cloth. In practice the thermosetting resin is heated until it liquefies and completely impregnates the TEFLON threads, after which it is cooled so that the resin acquires sufficient strength to grip the TEFLON threads during the subsequent operations of cutting and shaping without, however, attaining an advanced stage of polymerization.

Preferably the operation is carried out at a temperature between 110° and 150°C for from 1 minute to 15 minutes, so that the hardness obtained after cooling of the thermosetting resin is less than 95 Shore and preferably less than 90 Shore.

In accordance with the invention it is essential to use a thermosetting resin which is capable of acquiring this hardness by such a partial polymerization treatment and the temperature of complete polymerization of which is nevertheless below the melting temperature of the solder used to attach the cloth to the metal support.

The thickness of the resin layer obtained must be so selected that the TEFLON threads nevertheless appear on the outside.

In effect, it is the TEFLON threads, which have a very low coefficient of friction, which must ultimately constitute the smooth contact surface and not the thermosetting resin itself, the principal function of which is to surround the TEFLON threads so as to grip them firmly and stiffen the working surface of the bearing.

It is nevertheless preferable to select a thermosetting resin the coefficient of friction of which in the completely polymerized state is as low as possible because the TEFLON threads are moistened by the capillarity of this resin during its deposition. A little of this resin therefore remains on the friction surface constituted by the TEFLON threads.

After this operation and as a consequence of the selection of a temperature below the temperature at which the resin completely polymerizes, a layer of resin is obtained which is sufficiently resistant to hold the threads during subsequent cutting steps but nevertheless not so fragile as to be damaged by forming or rolling of the bearings.

The flat metal sheet thus soldered to the double-faced cloth, which is covered by the partially polymerized layer of resin, is then cut and the pieces thus obtained are shaped to produce bearings having the desired low friction.

After shaping the pieces, the thermosetting resin is hardened by complete polymerization at a temperature which is nevertheless below the melting point of the solder.

The complete polymerization is brought about in a continuous process, for example, by heating in an oven.

This operation may, for example, be carried out in a conventional manner at a temperature of 150° to 180°C for from 30 minutes to 10 hours. It should be noted, however, that the solder melts at about 183°C and it is therefore necessary that the temperature should not exceed this value in order to avoid deterioration of the bond between the cloth and the metal stamping.

This produces a bearing having low friction characteristics, the contact surface of which has excellent strength because of the presence of the polymerized resin and a low coefficient of friction because of the presence of the TEFLON threads which appear at the outside of the resin layer.

The bearings obtained are capable of supporting a working load of up to 40Kg/mm$^2$ and even 60Kg/mm$^2$, the limit depending in fact more upon the strength of the metal stamping than on the nature of the cloth. These results may be compared with those obtained in a case of conventional bearings utilizing a sintered bronze bushing having a TEFLON resin deposited in its pores. The maximum working load of these bearings is about 15Kg/mm$^2$ because of the lower resistance of the TEFLON resin and the sintered bronze support.

Finally, the fact that the TEFLON threads of the cloth are in direct contact with the metallic threads and with the solder attached to the metal plate insures excellent transmission of heat from the inside of the bearings to the outer ring. As a consequence of this particular arrangement the bearings according to the invention will tolerate a higher speed of rotation by the shaft for a given load.

The bearings according to the invention also perform better because of the grip on the TEFLON threads provided by the polymerized resin. The bearings produced in accordance with the process of the invention have a remarkable endurance during repeated oscillation under heavy loads.

Among the thermosetting resins which may be used in the process according to the invention are the phenolic resins such as BAKELITE obtained by the condensation of phenol with formic aldehyde. Particularly good results have, however, been obtained using a polyimide resin.

The layer of thermosetting resin may be deposited by coating the outer surface of the cloth with a prepolymerized resin in solution in a solvent at room temperature. The solvent is then evaporated by heating for several minutes at a sufficient temperature, which is generally of the order of 100°C. This results in a good impregnation of the cloth by the resin and a sufficient solidification of the resin to permit cutting of the metal stamping without risking fraying of the TEFLON threads, and to permit shaping of the cut-off pieces without breaking the incompletely polymerized resin layer.

In the case of polyimide resins, which may remain in the molten state at 150°C for as much as an hour before polymerization begins, the prepolymerized resin may be poured in the liquid state directly onto the cloth which has previously been soldered to the metal stamping, with the impregnation then taking place due to capillarity.

In a preferred embodiment the layer of resin may be deposited by electrostatically projecting a prepolymer of the resin in pulverulent form. This results in excellent penetration by introduction of particles of powder into the interstices of the cloth. Heating of the pulverulent layer at a temperature below its polymerization temperature for a very short time, followed by a rapid decrease in the temperature, makes it possible to embed the double-faced web in a tough layer resin which is not completely polymerized, with the TEFLON threads nevertheless remaining visible on the outside of this layer.

In a preferred embodiment of the process according to the invention the soldering operation is continuously carried out in the following manner:

A multi-layer strip produced by the superposition of a strip of double-faced cloth containing metal threads, of copper or stainless steel, and TEFLON threads on a sheet of solder in contact with the metallic face of the cloth and a metal stamping in the form of an endless strip beneath the solder is subjected to a temperature greater than that required to melt solder but nevertheless below the degradation temperature of TEFLON fibers.

The resulting multi-layer strip is preferably subjected to a substantially constant pressure, at least during the soldering operation itself and during the subsequent cooling.

The multi-layer strip may also advantageously be subjected to the same constant pressure before the soldering operation so that the assembly is held together perfectly from the time the softening of the layer of solder begins.

In a preferred embodiment the multi-layer strip is subjected successively to cooling, to heating to the soldering temperature, and then to cooling while a constant pressure is continuously exerted on the strip.

In this manner, an exact control of the time and temperature of the soldering is obtained.

The present invention also relates to an apparatus for soldering the double-faced strip according to the soldering process of the invention. It should, however, be noted that the apparatus which will now be described may also be used for other purposes which require the continuous soldering of the metallic surfaces of two strips by using a strip of solder placed between the two strips to be soldered together.

The apparatus according to the invention comprises input drive means adapted to the thickness of the multi-layer strip consisting of two strips to be soldered together and a strip of solder, and a heating device for increasing the temperature of the multi-layer strip during its passage through the apparatus according to the invention to a temperature greater than the melting point of the solder utilized.

The apparatus according to the invention also comprises an elastic membrane which may, for example, consist of a thin layer of steel or a metal foil which is held in contact with the multi-layer strip during its passage through the apparatus by appropriate means. This membrane extends over the width of the multi-layer strip and over a length corresponding at least to that of the soldering station proper. The means for holding this elastic membrane comprise an orifice for introducing a fluid under pressure in a manner such that the elastic membrane is subjected to the pressure of said fluid and transmits this pressure to the multi-layer strip during its passage through the apparatus. This produces a constant pressure which may be easily regulated, at least during the soldering step, as required in order to carry out the invention.

In a preferred embodiment of the soldering apparatus according to the invention, this comprises, upstream and downstream, of the heating device, two cooling units making it possible to obtain a more rapid increase and decrease in the temperature. In this embodiment the elastic membrane also acts on the cooling zones.

The present invention also relates to bearings obtained in accordance with the process according to the invention and in which the anti-friction threads of a thermoplastic fluorocarbon resin such as TEFLON form the outer surface of the cloth and are partially embedded in a layer of paraffin or polymerized thermosetting resins, with the anti-friction threads nevertheless projecting above the layer so as to form the low friction contact surface.

The double-faced cloth used in making the bearings according to the invention is preferably of the woven type, with the warp threads exclusively of TEFLON and the woof being made half of metallic threads such as copper or stainless steel and half of TEFLON.

The rolling step in the manufacture of bearings is then preferably so carried out that the woof threads are aligned with the generatrices of the bearing. It will be seen that in this manner the TEFLON threads which form the anti-friction contact surfaces extend in the direction of movement.

The invention will be better understood from a study of a preferred embodiment thereof which will now be described purely by way of illustration and example, with reference to the accompanying drawings, on which:

FIG. 2 is an exploded perspective view showing the soldering apparatus according to the invention; and FIG. 3 is a partial sectional view on an enlarged scale showing a bearing surface according to the present invention.

Figure 1:
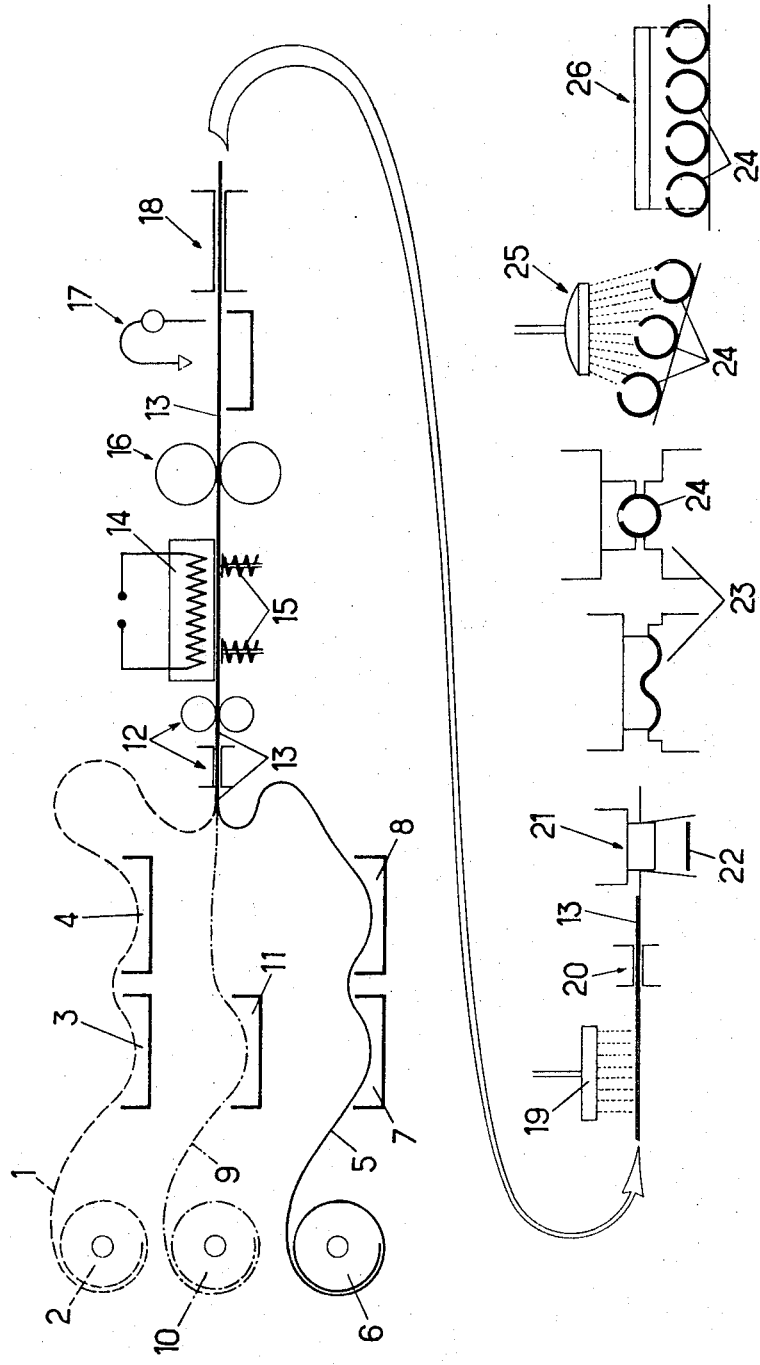
FIG. 1 is a schematic view showing the various steps of the process of manufacturing the bearings and bearing surfaces according to the invention.

On FIG. 1 it will be seen that the double-faced web is in the form of a continuous strip 1 wound on a roller 2. The TEFLON face is on the inside. The double-faced web 1 is first dipped into a degreasing bath 3 and then rinsed in a bath 4. A metal sheet wound in the form of a strip 5 on a roller 6 is itself subjected to a degreasing operation in a bath 7 and rinsing in the bath 8.

A sheet of tin solder 9 in the form of a strip wound on a roller 10 is fluxed in a bath 11 before being introduced at the same time as the web 1 and the metal sheet 5 into the drive means 12, so as to form a multi-layer strip 13, the sheet of solder 9 being positioned between the metal sheet 5 and the metallic surface of the double-faced cloth strip 1.

The assembly is then heated by means of the heater 14 to a temperature sufficient to melt the sheet of solder. This heater comprises means 15 for subjecting the multi-layer strip to a constant pressure during the soldering operation. It should be noted that the temperature and time during which the strip remains in the heating apparatus 14 are so selected as to avoid degradation of the TEFLON threads.

After passage through a calibrating device 16 the multi-layer strip 13 is rinsed at the station 17 and dried at the station 18. The outer surface of the web 1, which web is now soldered to the metal strip 5, is coated with a layer of a prepolymer of a thermosetting resin in pulverulent form projected thereonto by the electrostatic device 19. The resin thus deposited is subjected at 20 to a temperature sufficient to produce its fusion, the length of this heating step and the temperature attained being, however, insufficient to cause complete polymerization of the resin. At the output of the station 20 the temperature decreases and a tough layer of partially polymerized resin is obtained.

The multi-layer strip 13 which now comprises, in succession, a layer of metal, a layer of solder attaching the metal layer to the metallic surface of the double-faced web, a layer of partially polymerized resin, and finally the TEFLON surface of the web, is subjected to the action of a stamping press 21.

In the embodiment particularly illustrated on FIG. 1, which permits the manufacture of low friction bearings, the cut-off piece 22 is shaped in two operations in the press 23.

The resulting bearings 24 are then washed at the station 25 so as to eliminate undesirable particles which may have been deposited on the bearings during the mechanical operations of cutting and shaping.

Finally, the low friction bearings 24 are heated in an oven 26 in which the temperature and length of stay are such that the thermosetting resin deposited at 19 is completely polymerized so as to embed the TEFLON threads in an extremely hard layer, the threads nevertheless projecting from the upper surface so as to insure low friction contact.

FIG. 2 shows more specifically the soldering station 14 and 15 on FIG. 1. On this figure it will be seen that the apparatus comprises principally a frame 27 and an upper membrane holder 28, between which a thin elastic membrane 29 may be hermetically sealed. This membrane may be, for example, a foil strip.

The central part of the upper membrane holder 28 is provided with recesses 30 for receiving heating resistances. An orifice 31 passes through the upper membrane holder 28 and may be connected to a source of fluid under pressure, such, for example, as an air compressor.

The foil 29 is gripped between the upper membrane holder 28 and the frame 27 by means of bolts engaged in bolt holes 32. The frame 27 is provided with recesses 27a which receive the multi-layer strip 13 in the apparatus.

The assembly comprising the upper membrane holder 28, the foil 29, and the frame 27 is mounted on a metal plate 33 over which the multi-layer strip 13 which is to be soldered is advanced in the direction of the arrow 34. The multi-layer strip 13, the thickness of which is greatly exaggerated in the drawing, enters the apparatus in the form of three distinct superposed strips 1, 9 and 5. It is laterally guided by adjustable stops 35 and leaves the apparatus in the form of two strips soldered together. The metallic plate 33 is itself mounted on two cooling blocks 36 spaced by a central heating block 37. The cooling blocks 36 have cooling ducts 38 for a cooling fluid, while the heating block 37 is provided with transverse ducts 39 for receiving electrical heating resistances.

It will be seen that in this manner the multi-layer strip 13 is first cooled by the first cooling block 36 so that no softening of the solder strip 9 can take place before it reaches the central heating zone which corresponds to the soldering operation proper.

In the central position the heating elements in the ducts 39 of the heating block 37 and the ducts 30 of the upper membrane holder 28 increase the temperature sufficiently to melt the strip of solder 9 while the multi-layer strip 13 is subjected to the pressure of the fluid under pressure introduced through the orifice 31, which pressure is transmitted constantly through the foil 29.

After it has passed through the central heating zone, the multi-layer strip 13 is cooled by a second cooling block 36.

FIG. 2 also shows that the dimensions of the strip of foil 29 and the box 27 are such that the multi-layer strip 13 is subjected to the pressure of the fluid throughout the time it is passing over the metal plate 33 during both the cooling and heating steps.

It will be seen that, in the soldering apparatus according to the invention, the pressure exerted on the multi-layer strip 13 during the soldering operation is maintained at a constant easily adjustable value.

FIG. 3 is a sectional view on a greatly enlarged scale taken through a portion of the surface of the bearing produced by the process according to the invention.

In this figure it will be seen that the bearing surface consists of a succession of layers, the lower layer being the stamping 5, covered by a layer of tin solder 40 in which the metallic threads 41 which form part of the woof of the double-faced cloth 1 are embedded. A layer of polymerized thermosetting resin 42 holds the TEFLON threads 43 which form the warp of the double-faced web 1. The thickness of this resin layer 42 is, however, such that the threads 43 appear on its exterior and form the smooth contact surface 44 of the bearing.

FIG. 3 shows that the TEFLON threads 45 forming part of the woof of the double-faced web 1 are embedded in the resin layer 42 and perfectly gripped thereby.

It should be noted, however, that as clearly shown on FIG. 3, it is in fact the layer of solder 40 which attaches the double-faced web 1 to the stamped sheet 5, since the thermosetting resin 42 serves only to hold together the TEFLON threads 44 and 45 and not to attach the web 1 to the stamped sheet 5.

The following examples illustrate the extremely valuable performance which it is possible to obtain with bearings manufactured in accordance with the invention.

EXAMPLE 1

A double-faced web having woven layers is used. The woof is made partly of copper threads having four strands 0.06mm in diameter, at the ratio of 25 threads per cm, and partly of 400 denier TEFLON thread at the ratio of 25 threads per cm.

The warp consists entirely of 400 denier TEFLON thread at the ratio of 60 threads per cm. The weight of the cloth is 760gr/m$^2$ and the percentage of copper by weight is 38 percent.

The metallic surface of this web is soldered to a metal sheet 1.5 mm thick. The web is covered with a layer of prepolymerized phenolic resin in solution in a solvent and the assembly is subjected to a pressure of 1 bar for 10 minutes at 110°C.

The outer face of the web is again covered with a layer of the same solution of prepolymerized phenolic resin which is subjected for 10 minutes to a temperature of 150°C without pressure. It is found that the resin has been thus subjected to partial polymerization and that it yas become tough but not fragile.

The measured hardness of the layer of resin is about 90 Shore. The TEFLON threads appear at the surface of the resin layer.

A piece is then cut off which is shaped to produce a bushing having a diameter of 45 mm and a length of 20 mm, with the woof threads extending axially.

The shaped bushing is heated to 160°C for 6 hours so as to completely polymerize the phenolic resin which is transformed into BAKELITE. The resulting bushing is subjected to a pressure of 2,000 daN, which corresponds to a pressure of 2.2Kg/mm$^2$. The bushing is then oscillated at a frequency of one Hertz through an angle of about 15°. It is found that the bushing supports its load without significant deterioration for 278 hours, or about 1 million oscillations. The average temperature of the test is 48°C (or about 20°C above the ambient temperature).

EXAMPLE 2

The web is soldered in the same manner to an identical metallic sheet. It is covered by electrostatically projecting against the outer surface of the web a pulverulent layer of a prepolymer of polybismaleimide obtained by condensing an aromatic diamine on an aromatic dianhydride, which is a polyimide resin sold by the Rhone Poulenc Company under the trademark KINEL.

The pulverulent layer is melted at 150°C for less than 1 minute. Almost instantaneous impregnation takes place since at this temperature the viscosity of the unpolymerized molten resin is practically identical to that of water. After cooling, the result is a layer of tough resin which is not fragile and the hardness of which is about 85 Shore, with the TEFLON threads nevertheless appearing on the outside.

After cutting off and shaping a bushing in a manner analogous to that of Example 1, the polyimide resin is then completely polymerized by heating it at 175°C for 10 hours. The resulting bushing is subjected to the same tests as in Example 1 with the following results: durability in hours 375, that is to say, 1,350,000 oscillations. The average temperature of the test is 50°C (or about 25°C above the ambient temperature).

The present invention has been described with particular reference to the use of a web comprising TEFLON threads. It will nevertheless be appreciated that the invention is not limited to this particular embodiment. It is thus obvious to one skilled in the art that the TEFLON threads could be replaced by threads made of any material having comparable anti-friction characteristics and especially by another thermoplastic fluorocarbon resin. In like manner the invention is not limited to the use of a cloth but also encompasses the use of an unwoven or felted material as the contact surface. In this case the TEFLON threads and the metallic threads are interlaced in an irregular manner so that one of the surfaces of said material consists principally of TEFLON threads, while the other surface consists principally of metallic threads.

What is claimed is:

1. Method of manufacturing a bearing material having a low coefficient of friction of the type comprising a friction surface made of a thin web comprising metallic threads and threads of a thermoplastic fluorocarbon resin, said threads being so interlaced so that one of the faces of the material consists principally of metallic threads while the other face consists essentially of fluorocarbon resin threads, and the metallic face being soldered to a metal sheet, which process comprises the step of cutting and shaping the material after soldering and is characterized by the fact that, after soldering the web on the flat metal sheet and before cutting the resulting bearing material, a layer of a product having a low melting point capable of impregnating the web comprising threads of thermoplastic fluorocarbon resin is placed on said web in liquid form so as to produce a tough, non-fragile layer having a thickness such that the thermoplastic fluorocarbon resin threads project from said layer.

2. Method as claimed in claim 1 in which the product having a low melting point is a thermosetting prepolymerized resin and said layer is subjected, before cutting and shaping, to a temperature insufficient to completely polymerize the resin but sufficient to produce a strong non-fragile layer having a thickness such that the anti-friction threads project therefrom, and that after the pieces are cut and shaped the resin layer is completely polymerized at a temperature below the melting point of the solder.

3. Method as claimed in claim 1 in which said product is paraffin.

4. Method as claimed in claim 2 in which said thermo-setting resin is a phenolic resin.

5. Method as claimed in claim 2 in which the thermosetting resin is a polyimide resin.

6. Method as claimed in claim 2 in which the temperature at which the resin layer is heated before forming is between 110°C and 150°C, the length of the treatment being between 1 minute and 15 minutes, so that the hardness of the resulting layer, before forming is less than 95 Shore.

7. Method as claimed in claim 2 in which the layer of prepolymerized resin is deposited by applying it in the liquid state, using a solution containing said prepolymerized thermo-setting resin in a solvent, the solvent being then eliminated by evaporation at a temperature less than the polymerization temperature of the resin.

8. Method as claimed in claim 2 in which the layer of prepolymerized resin is produced by electrostatically depositing a prepolymerized thermosetting resin in a pulverulent form and that said prepolymerized resin is then subjected to a temperature beneath the polymerization temperature of the resin.

9. Method as claimed in claim 2 in which the prepolymerized resin layer is applied in the form of a liquid at a temperature beneath the polymerization temperature of said resin.

10. Method as claimed in claim 1 in which the soldering step is continuously carried out while subjecting to a constant pressure and a temperature greater than that required to melt the solder but less than a temperature which will degrade the fluorocarbon threads, a continuous multi-layer strip formed by superposing a strip of thin material comprising the metallic threads and fluorocarbon threads, a strip of solder in contact with the metallic surface of said material, and a sheet of metal, said multi-layer strip being cooled before and after the soldering while maintaining it at the same constant pressure.

11. Method as claimed in claim 1 in which said thermoplastic fluorocarbon resin is polytetrafluoroethylene.

12. Method as claimed in claim 1 in which said metallic threads are copper.

13. Method as claimed in claim 1 in which said metallic threads are stainless steel.

14. A bearing material having a low coefficient of friction of the type comprising a friction surface made of a thin web comprising metallic threads and threads of a thermoplastic fluorocarbon resin, said threads being so interlaced so that one of the faces of the material consists principally of metallic threads while the other face consists essentially of fluorocarbon resin threads, and the metallic face being soldered to a metal sheet, which material has been cut and shaped after soldering and which is characterized by the fact that, after said soldering and before said cutting and shaping, a layer of a product having a low melting point capable of impregnating the web comprising threads of thermoplastic fluorocarbon resin was placed on said web in liquid form so as to produce a tough, non-fragile layer having a thickness such that the thermoplastic fluorocarbon resin threads project from said layer.

15. Bearing material as claimed in claim 14 in which the product having a low melting point is a thermosetting prepolymerized resin and said layer was subjected, before cutting and shaping, to a temperature insufficient to completely polymerize the resin but sufficient to produce a strong non-fragile layer having a thickness such that the anti-friction threads project therefrom, and that after the pieces were cut and shaped the resin layer was completely polymerized at a temperature below the melting point of the solder.

16. Bearing material as claimed in claim 14 in which said product is paraffin.

17. Bearing material as claimed in claim 15 in which said thermosetting resin is a phenolic resin.

18. Bearing material as claimed in claim 15 in which the thermosetting resin is a polyimide resin.

19. Bearing material as claimed in claim 14 in which the double-faced web has a woven structure, the warp threads being exclusively polytetrafluoroethylene and the woof threads alternately metallic and polytetrafluoroethylene.

20. Bearing material as claimed in claim 14 in which the metallic threads of the web are copper.

21. Bearing material as claimed in claim 14 in which the metallic threads of the web are stainless steel.

* * * * *